(12) United States Patent
Mann et al.

(10) Patent No.: US 8,011,912 B2
(45) Date of Patent: Sep. 6, 2011

(54) POSITIONABLE GAS INJECTION NOZZLE ASSEMBLY FOR AN UNDERWATER PELLETIZING SYSTEM

(75) Inventors: Robert G. Mann, Covington, VA (US); Charles W. Simmons, Fincastle, VA (US); Robert A. Ryan, Roanoke, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 25 days.

(21) Appl. No.: 12/213,204

(22) Filed: Jun. 16, 2008

(65) Prior Publication Data

US 2009/0309247 A1   Dec. 17, 2009

(51) Int. Cl.
*B29B 9/02* (2006.01)

(52) U.S. Cl. .............................. 425/7; 425/113

(58) Field of Classification Search ............... 425/68, 425/311, 448, 313, 70, DIG. 230, 67, 6
See application file for complete search history.

(56) References Cited

U.S. PATENT DOCUMENTS

| | | | | |
|---|---|---|---|---|
| 3,807,882 A | * | 4/1974 | Munz | 401/257 |
| 4,262,034 A | * | 4/1981 | Andersen | 427/450 |
| 4,850,717 A | * | 7/1989 | Clark et al. | 374/208 |
| 5,443,662 A | * | 8/1995 | Arai et al. | 148/209 |
| 6,171,280 B1 | * | 1/2001 | Imazu et al. | 604/118 |
| 6,273,463 B1 | * | 8/2001 | Peterson et al. | 280/739 |
| 7,157,032 B2 | | 1/2007 | Eloo | |
| 2001/0030475 A1 | * | 10/2001 | Kliman et al. | 310/89 |
| 2003/0023239 A1 | * | 1/2003 | Burbank et al. | 606/45 |
| 2004/0045122 A1 | * | 3/2004 | Paterson | 15/340.1 |
| 2004/0107532 A1 | * | 6/2004 | Murphy | 15/414 |
| 2005/0110182 A1 | | 5/2005 | Eloo | |
| 2005/0172872 A1 | * | 8/2005 | Kaster et al. | 111/164 |
| 2007/0071907 A1 | * | 3/2007 | Stiles et al. | 427/554 |
| 2007/0132134 A1 | | 6/2007 | Eloo | |

FOREIGN PATENT DOCUMENTS

| WO | WO 2005/051623 A1 | 6/2005 |
|---|---|---|
| WO | WO 2006/127698 A2 | 11/2006 |
| WO | WO 2007/027877 A1 | 8/2007 |

* cited by examiner

*Primary Examiner* — Christina Johnson
*Assistant Examiner* — Xue Liu
(74) *Attorney, Agent, or Firm* — Jacobson Holman PLLC

(57) ABSTRACT

A positionable gas nozzle assembly for injecting and directing pressurized air or other gas having an inert nature into a pellet slurry so as to increase the velocity of the slurry from a pelletizer to and through a dryer. The variably positionable nozzle can be inserted, retracted and/or intermediately positioned to facilitate start-up of the pelletization process, reduce or eliminate pellet hang-up points, maximize and optimize the velocity of the pellet slurry throughput, and to adjust the aspiration level of the pellet slurry such that the internal heat of the pellets is retained for improved degrees of crystallization and/or drying.

32 Claims, 8 Drawing Sheets

POSITIONABLE GAS INJECTION NOZZLE ASSEMBLY FOR AN UNDERWATER PELLETIZING SYSTEM

BACKGROUND OF THE INVENTION

1. Field of the Invention

The present invention relates generally to underwater pelletizing systems and, more particularly, to a gas injection nozzle for use with such systems.

2. Description of Related Art

Those skilled in the art have found it beneficial, and sometimes necessary, to produce pellets that crystallize, either partially or fully. To help achieve that crystallization, the assignee of the present invention has disclosed the use of a nozzle through which pressurized air or other gas can be injected into the pellet slurry to help decrease the retention time of the pellets in the transportation liquid between the upstream pelletization process and the downstream drying and subsequent processes in U.S. Pat. No. 7,157,032; U.S. Patent Application Publication Nos. 2005/0110182 and 2007/0132134; World Patent Application Publication Nos. WO 2005/051623, and WO 2006/127698, all of which are owned by the current assignee of the present invention and are incorporated herein by reference as if fully set forth in their entirety.

Similarly, WO 2007/027877 discloses the use of a nozzle through which pressurized air or other gas can be injected into the pellet slurry to facilitate aspiration of the liquid from the pellets in the pellet slurry. Moisture content of the pellets is lowered by reducing the retention time of the pellets in the transportation liquid between the upstream pelletization process and the downstream drying and subsequent processes. The reduced retention time also results in more of the internal heat of the pellets formed being retained, and thus reduces the moisture available for uptake by the pellets. This application, also owned by the current assignee of the present invention, is also incorporated by reference herein in its entirety.

Under certain conditions, pellets can clump or form agglomerates during the pelletizing process. The formation of pellet agglomerates can have many causes, of which sticky pellets is both common and frequent. When these agglomerates form they have the tendency to get caught in so-called "hang-up points", a term used herein to describe locations throughout the process where pellets and/or agglomerates of pellets tend to get hung-up and remain, often forming an obstructive build-up. As an example, agglomerates of pellets can form when "drooling", excessive flow of molten material through the die holes, occurs at the die plate, thus creating an undesirably large pellet. Large pellets are not the only problem. Pellets of desirable size can create a problem as well. Sticky pellets, or pellets that are still soft, that come into contact with the nozzle can be "smashed" and stick to the nozzle due to their stickiness and the velocities at which they are traveling. Eventually more and more pellets come into contact with those stuck on the nozzle and pellets begin to adhere to each other creating a mass of pellets, also referred to as an agglomerate. Eventually the mass of pellets can become large enough to disrupt the flow of transport liquid and pellets through the transport pipe. This disruption can force the pelletization process to be stopped.

One such hang-up point has been found to exist in pelletization lines utilizing the apparatus and process of inserting pressurized gas described in the afore-identified patents and applications, namely the point at which the gas insertion nozzle is located within the pellet transport pipe. According to these prior embodiments, the nozzle used to inject the air is as illustrated in FIG. 1 and generally designated by the reference numeral 200. The prior art fixed nozzle tube 210 is attached, preferably by welding, into elbow 202 at juncture 214. This fixed nozzle assembly 200 cannot be removed to facilitate start-up. It can further serve as a potential source for occlusion by pellet agglomeration as it cannot be maneuverably positioned to permit free flow of the pellet slurry about the periphery of the fixed nozzle pipe 210. Similarly, the fixed position limits the degree to which the air or other gas being injected can be controlled through valve regulation.

Therefore, a need exists for a positionable nozzle that can be adjusted to optimize the crystallization and/or drying of pellets produced by an underwater pelletizing system.

SUMMARY OF THE INVENTION

In view of the foregoing, it is an object of the present invention to provide a positionable nozzle through which pressurized gas is introduced into the transport apparatus of an underwater pelletizer to increase the velocity of a pellet slurry being transported from a pelletizing process to and through a drying process while controlling the dynamics of the slurry flow through changes in the position of the nozzle.

Another object of the present invention is to provide a positionable nozzle having a nozzle tube and collar that slides within a housing attached to a seal transition collar and affixed to an elbow within the transport pathway between the pelletization apparatus and the drying apparatus.

Still another object of the present invention is to provide a positionable nozzle in accordance with the preceding objects that is manually or mechanically adjustable between at least a fully inserted or forward position and a fully retracted position.

A still further object of the present invention is to provide a positionable nozzle in accordance with the preceding objects that can be manually or mechanically adjusted to inject pressurized gas in one or more intermediate or partially inserted positions.

A further object of the present invention is to provide a positionable nozzle in accordance with the preceding objects that is angularly positioned within the lumen of the elbow to which it is attached such that the angle ranges from approximately 0° from the centerline of the downstream assembly to a maximum angle defined by contact of the outside of the nozzle tube with the inside surface of that downstream assembly.

Yet another object of the present invention is to provide a positionable nozzle that is concentrically centered about the centerline of the downstream equipment.

Still a further object of the present invention is to provide a positionable nozzle through which pressurized gas is introduced that increases the velocity of a pellet slurry being transported from a pelletizing apparatus to and through a drying apparatus such that the internal heat of the pellets is retained to facilitate drying of the pellets such that the moisture content of the pellets leaving the drying apparatus is less than approximately 1.0% by weight, more preferably less than 0.5% by weight, and most preferably less than 0.25% by weight.

An additional object of the present invention is to provide a positionable nozzle through which pressurized gas is introduced to increase the velocity of a pellet slurry being transported from a pelletizing apparatus to and through a drying apparatus such that the internal heat of the pellets is retained to facilitate both drying and crystallization of the pellets.

A further object of the present invention is to provide a positionable nozzle in accordance with the preceding object through which pressurized gas is introduced that increases the velocity of a pellet slurry being transported from a pelletizing apparatus to and through a drying apparatus such that the pellets leaving the drying apparatus are crystallized at least 20% by weight, more preferably at least 30% by weight, and most preferably at least 40% by weight.

Yet a further object of the present invention is to provide a positionable nozzle that can be retracted at least partially to prevent pellet hang-up during start-up of the pelletization process, and that can be moved forward to expedite the flow of the pellet slurry into and through the transport pipe and to facilitate the aspiration of the transport liquid away from the pellets as they move through the transport pipe.

A still further object of the present invention is to provide a positionable nozzle having any of a number of cross-sectional shapes, inner surface variations or internal structures in order to produce specific desired effects on the flow of the pellet slurry.

In view of these and other objects, the present invention is directed to an injecting device for use with an underwater pelletizer apparatus that extrudes and cuts polymer strands into pellets which are conveyed as a water and pellet slurry through transport piping to a centrifugal dryer. The injecting device includes a positionable nozzle assembly having an adjustable injection position to introduce a pellet speed expediter into the water and pellet slurry to increase a velocity of the pellet slurry to and through the dryer such that more internal heat of the pellets is retained. The nozzle assembly is adjustable between a fully inserted position in which a nozzle tube of the assembly is positioned forwardly within the transport piping and a fully retracted position in which the nozzle tube is withdrawn from the transport piping to provide wholly unobstructed flow of the slurry through the piping. Preferably, the positionable nozzle assembly is configured so that the nozzle tube can be positioned manually or mechanically, at various intermediate positions between the fully inserted forward position and the fully retracted position.

These benefits together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
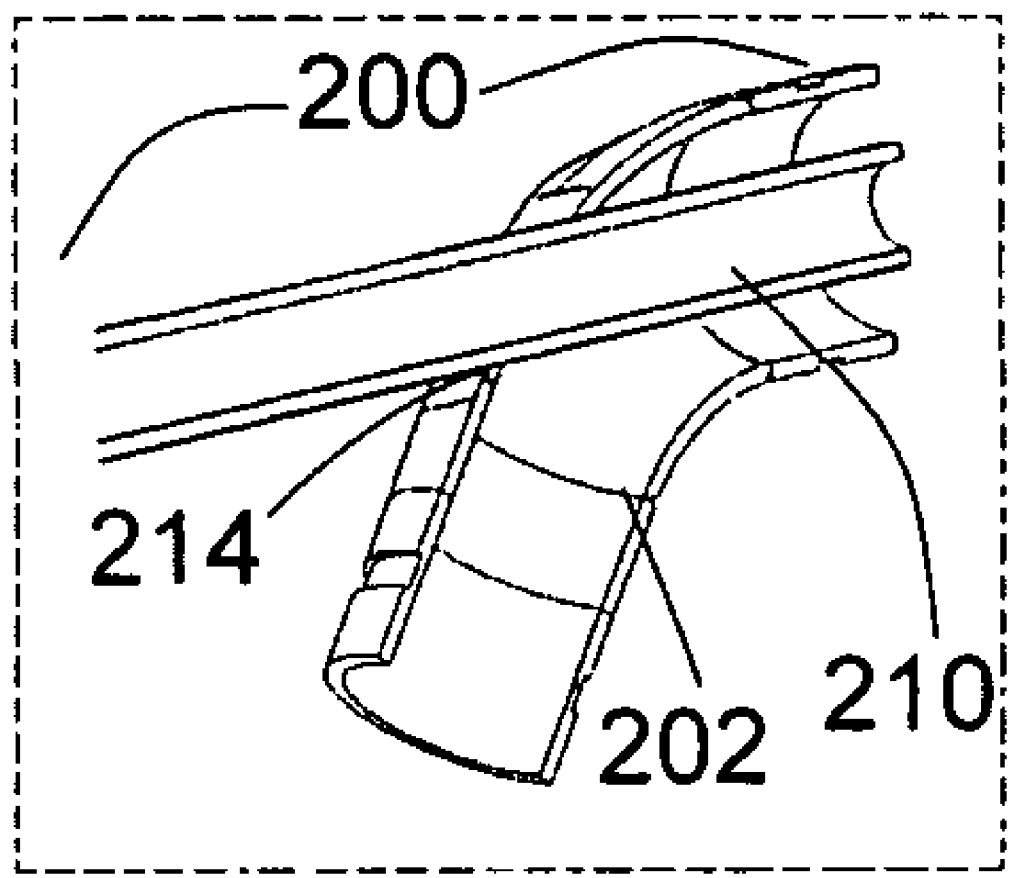
FIG. 1 is a cut-away and cross-sectional illustration of a prior art fixed nozzle configuration.

Although preferred embodiments of the invention are explained in detail, it is to be understood that other embodiments are possible. Accordingly, it is not intended that the invention is to be limited in its scope to the details of constructions, and arrangement of components set forth in the following description or illustrated in the drawings. The invention is capable of other embodiments and of being or carried out in various ways. Also, in describing preferred embodiments, specific terminology will be resorted to for the sake of clarity. It is to be understood that each specific term includes all technical equivalents which operate in a similar manner to accomplish a similar purpose. Where possible, components of the drawings that are alike are identified by the same reference numbers.

The positionable nozzle assembly according to the present invention helps to enhance the crystallization of various polymeric materials and also facilitates drying of those and other materials while eliminating a possible hang-up point for agglomerates that has been encountered with prior designs. With pressurized air or other gas injected into the pellet transportation pipe, the velocity of the pellet slurry is increased. The result is a decrease in time that the pellets are subjected to the transport liquid due to that increased velocity as well as the aspiration of transport liquid away from the surface of those pellets. Due to the increased velocity, the retention time of the pellets in the transport liquid is less, allowing the pellets to retain more internal heat than had they been subjected to the transportation liquid for a longer period. In effect, it is the increase in retained internal heat that aids in the crystallization of the pellets. This effect is further enhanced by the aspiration of the transport liquid away from the surface of the pellets such that loss of heat to the transfer liquid is reduced.

To achieve the maximum throughput of the pellets, the present invention allows the geometry and positioning of the nozzle to be adjusted. This is important to the velocity at which the slurry is transported from the pelletizer to the dryer which, in turn, impacts the efficiency of the system in separating the pellets from the transport liquid by aspiration and increasing the amount of internal heat retained by the pellets. Changing the geometry and positioning of the nozzle can also serve to alter the flow pattern of the slurry through the transport pipe, creating more or less turbulence to meet specific requirements associated with the material being processed.

Figure 2:
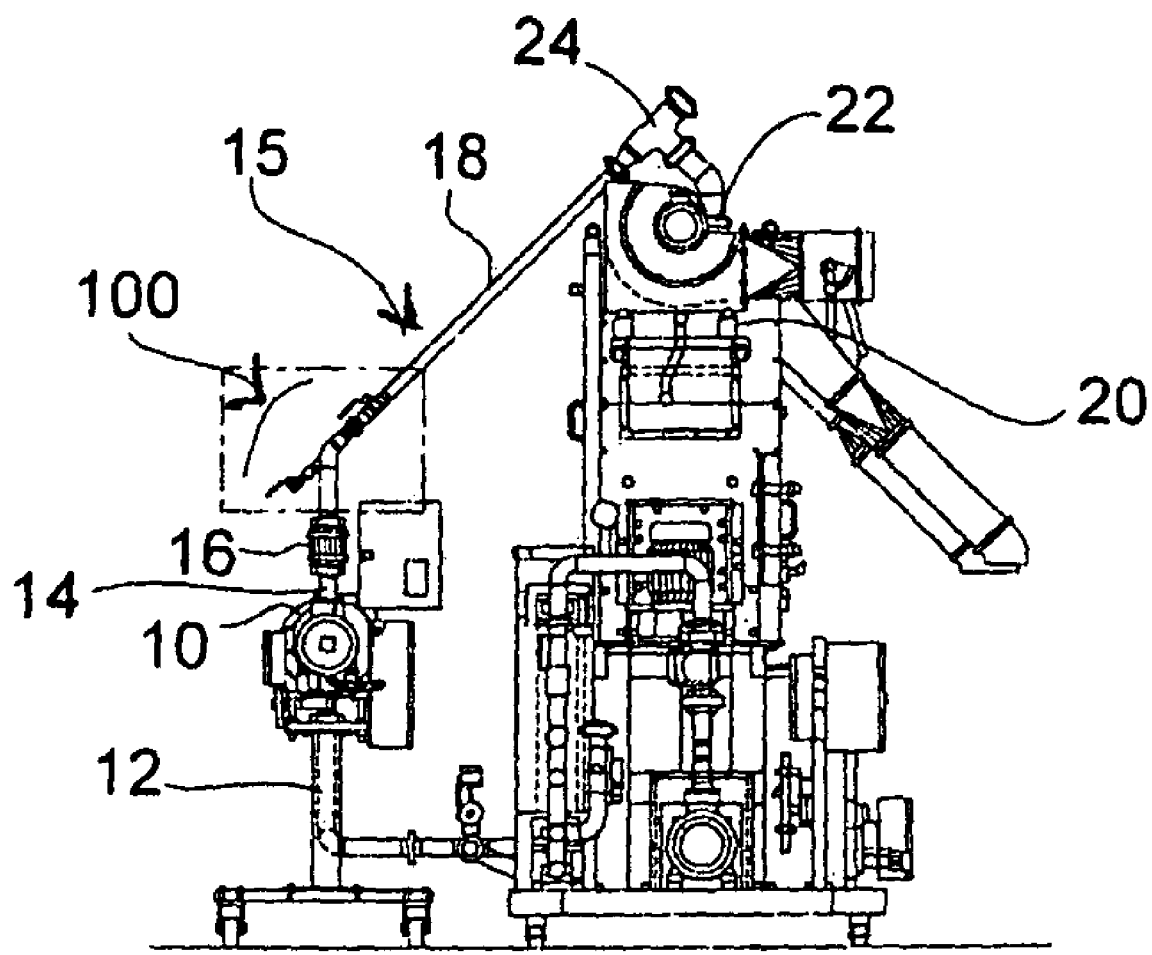
FIG. 2 is a schematic illustration of an underwater pelletizing system including an underwater pelletizer and transport piping with a positionable nozzle connected to a centrifugal dryer in accordance with the present invention.

Turning now to FIG. 2, the positionable nozzle in accordance with the present invention, generally designated by the reference numeral 100, is assembled into the transport piping, generally designated by the reference numeral 15, that connects the pelletization apparatus 10 to the drying apparatus 20 and any subsequent post-processing. A melting and mixing apparatus, not shown, connects to the pelletizer 10 to which is attached inlet pipe 12. Transport liquid is introduced through inlet pipe 12 into the cutting chamber of pelletizer 10 where it mixes with the pellets to form the pellet slurry. The pellet slurry exits through outlet pipe 14 into and through sight glass 16 and then past the positionable nozzle assembly 100 in transport piping 15. A pellet speed expediter is injected and directed into the transport piping through the positionable nozzle assembly 100 to reduce the time the pellets are subjected to the transport liquid. The pellet speed expediter is preferably air in view of its inert nature and ready availability. However, other gases having inert characteristics such as nitrogen or similar gases could be used. The expedited pellet and transport liquid passes through transport pipe 18 into and through dryer assembly 20 wherein the pellets are dewatered and dried. Details of the expedited pellet and transport liquid follow below.

The melting and mixing apparatus, not shown, can be any prior known apparatus or combinations thereof and can include, without being limited thereto, melt vessels, single screw extruders, twin screw extruders, static mixers, continuous mixers, Banbury-type mixers, and the like as is known to those skilled in the art.

The pelletizer 10 can be a water ring pelletizer, an underwater pelletizer, and the like, and is preferably an underwater pelletizer fitted with an extrusion die as is well known to those skilled in the art. Transport liquid can be any liquid and is preferably water. Optionally, the water or other transport liquid can contain additives including, but not limited to, flow modifiers, coatings, defoamers, cosolvents, and the like. As used herein, when references are made to "water" in connection with the transport liquid, such references are intended to refer to any liquid suitable for use as a transport liquid, with or without additives, and not just water.

The materials being pelletized and transported in accordance with the present invention can be polymers, waxes, and the like that are conventionally processed by pelletization. As examples, the materials can include polyolefins, polyesters, polyethers, polythioethers, polyamides, polyamideimides, polysulfones, polycarbonates, polyurethanes, fluoropolymers, vinyl polymers, biodegradable polymers, and copolymers thereof. Preferably the materials are those that are typically crystallized before further processing, and more preferably the materials can be dried to a moisture content of less than 1% by weight and crystallized to a level of at least 20%. Even more preferably, the materials can be dried to a moisture content less than 0.50% moisture by weight and crystallized to a level of at least 30% by weight, and most preferably the materials can be dried to a moisture content less than 0.25% by weight and crystallized to a level of at least 40% by weight.

Alternatively and optionally, the materials to be pelletized can contain any conventional filler and combinations of fillers and/or other additives as are known to those skilled in the art. The fillers can include cellulosic powders and/or fibers, biomaterials including powders and fibers, and the like.

The dryer 20 in FIG. 2 can be at least one of a dewatering device, filtration device, vibratory dewatering device, fluidized bed, tumble dryer, centrifuge, dryer, centrifugal dryer, and is preferably a self-cleaning centrifugal dryer. Post-processing can include but is not limited to at least one of cooling, enhanced crystallization, heating, additional drying, sizing, solid state polycondensation or solid state polymerization, packaging, and the like as is well known to those skilled in the art.

Figure 2A:
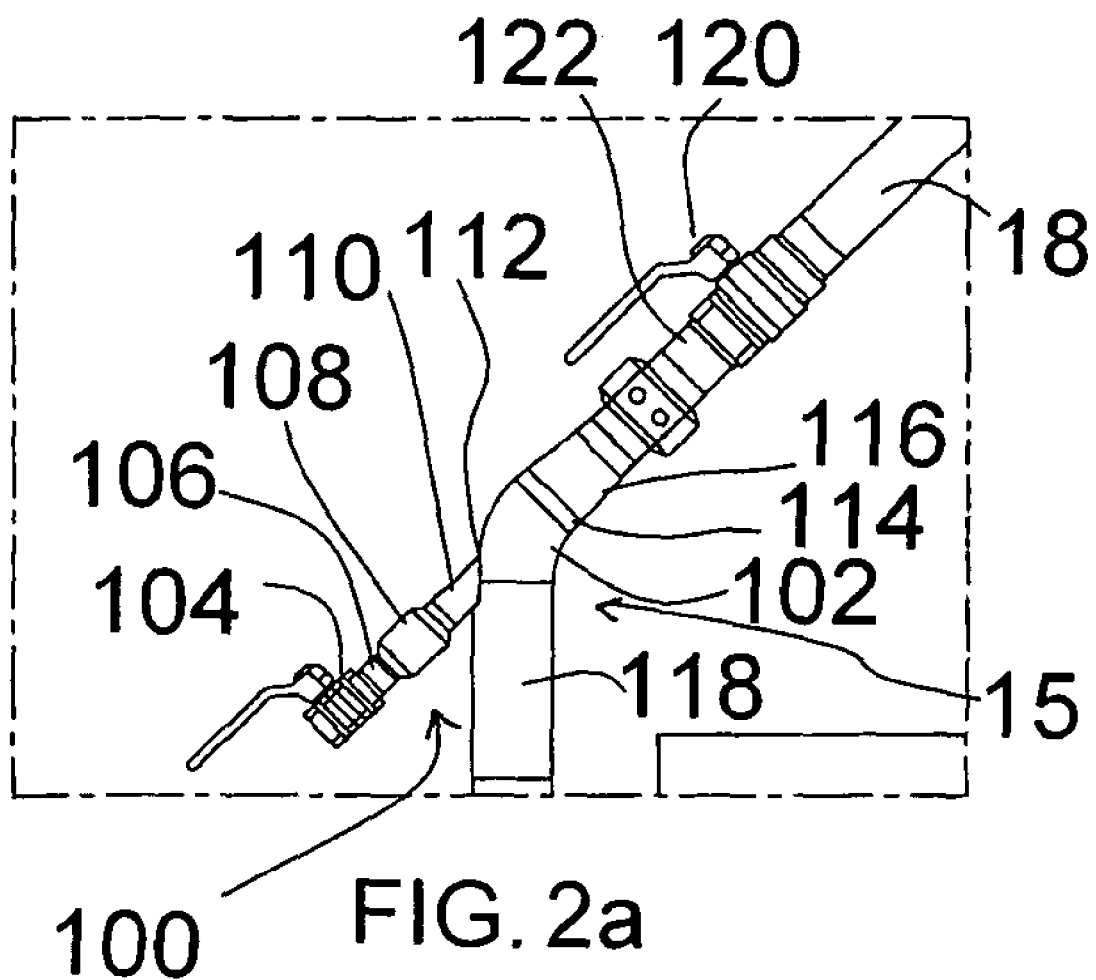
FIG. 2a is an enlarged view illustration of the positionable nozzle of FIG. 2.

One embodiment of the positionable nozzle assembly 100 according to the present invention is shown in more detail in the enlarged view of FIG. 2*a*. The assembly includes a valve 104, a pipe 106, a check valve 108, and a nozzle tube 110 which is partially inserted into elbow 102 and not visible, as indicated by the dotted line. The nozzle tube 110 is inserted into elbow 102 at insertion point 112 and extends into the lumen of elbow 102 to the juncture 114 of elbow 102 and effluent pipe 116. Inlet gas line, not shown, is attached to valve 104, which is preferably a ball valve.

The pellet slurry passing through sight glass 16 (see FIG. 2) passes through influent pipe 118 and into and through elbow 102, where it interacts with the pressurized gas, preferably air, before passing into effluent pipe 116 and through valve 120. Influent pipe 118, elbow 102, and effluent pipe 116 can be a single piece of pipe that has been modified by bending to shape the elbow and to allow insertion of nozzle tube 110. Preferably, however, the influent pipe 118, elbow 102, and effluent pipe 116 are separate components that are attached together, such as by threaded engagement or welding. Influent pipe 118 and effluent pipe 116 can be the same diameter as elbow 102, or they can be of different diameter than the elbow 102 in which case they are preferably tapered to the diameter of elbow 102. According to a preferred embodiment, influent pipe 118 and elbow 102 are the same diameter and effluent pipe 116 taperingly decreases in diameter from the juncture 114 with elbow 102 to the attachment with pipe extension 122 leading to and connecting with valve 120. Valve 120 is connected, preferably by threaded engagement or by welding, to transport pipe 18.

Optionally, effluent pipe 116 and pipe extension 122 can be disconnectedly attached by a quick disconnect connection 124 as illustrated in FIG. 2*a*. The quick disconnect connection 124 can be any suitable pipe quick-disconnect assembly. Such a connection facilitates ease of access to the elbow and nozzle assembly for inspection, cleaning, maintenance, and repair as needed.

Influent pipe 118, elbow 102, effluent pipe 116, and nozzle tube 110 are preferably made of metal including tool steel, vanadium steel, carbon steel, hardened steel, stainless steel, nickel steel, and the like, but can also be made of wear resistant industrial grade plastic. These components are more preferably made of stainless steel and most preferably made of low carbon stainless steel.

Check valve 108 is preferably placed between a receiver tank (not shown) and the elbow 102 and prevents water and pellets from backing up into the receiver tank. Check valve 108 allows pressurized air or other gas to flow through it, but when air or other gas is not passing through it, pressure from the transport liquid will cause check valve 108 to shut, thus preventing a back flow of transport liquid and pellets. Alternatively, an automated valve, preferably an electromechanical valve with an actuator, can be substituted for check valve 108.

Valve 104 allows the operator to control the flow rate of the pressurized air or other gas. Preferably a ball valve, valve 104 is attached, such as by bolting, welding, or threaded attachment, to nozzle tube 110. Valve 104 is most preferably attached sequentially to pipe 106, check valve 108, and nozzle tube 110. Optionally and alternatively, an electromechanical valve can be substituted for both valve 104 and check valve 108.

Valve 120 can further regulate the velocity of the pressurized air or other gas. Valve 104 can be closed to allow conventional pelletization processing without the need for pressurized gas injection. Both valve 104 and valve 120 are optional and either can be used alone without the other. Preferably, valve 104 is present for regulation of the pressurized gas and more preferably, valve 104 and valve 120 are used in synergistic combination for the greatest control and regulation of the pressurized air or other gas.

Figure 3:
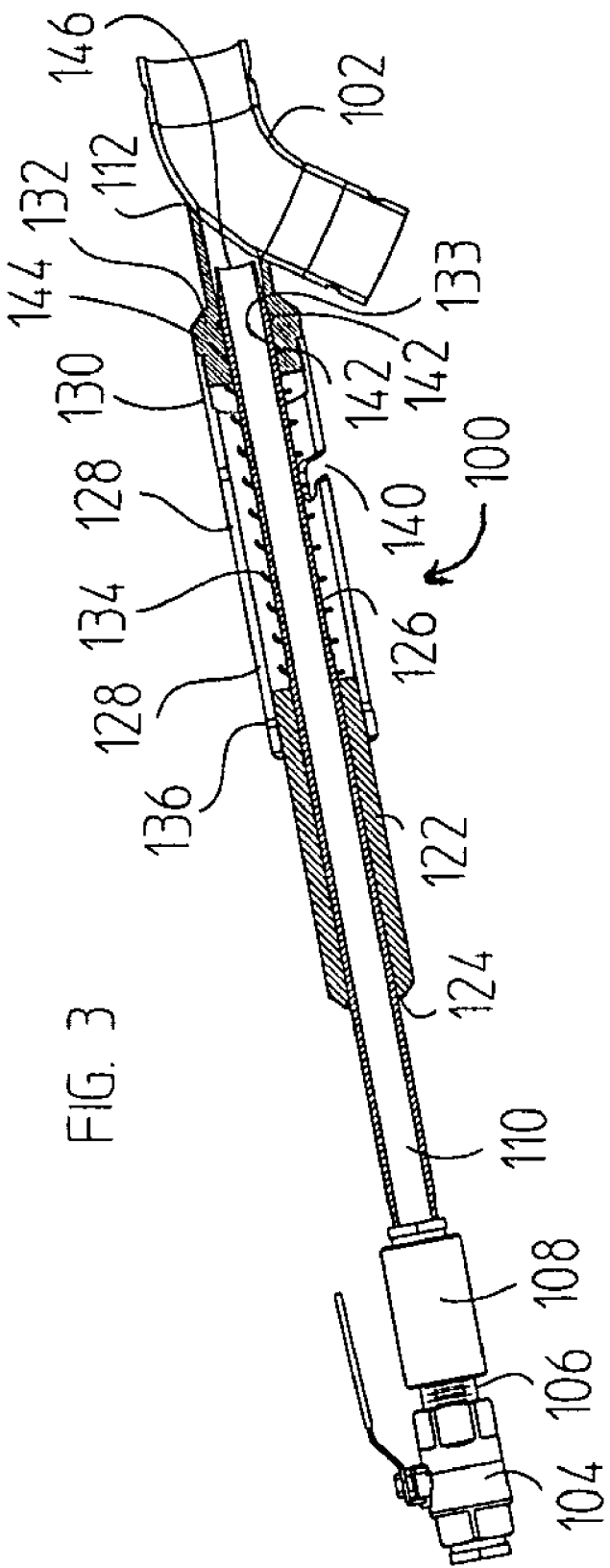
FIG. 3 is a cut-away and cross-sectional illustration of a portion of the positional nozzle and transport piping of FIG. 2a with the nozzle tube in a retracted position.
Figure 4:
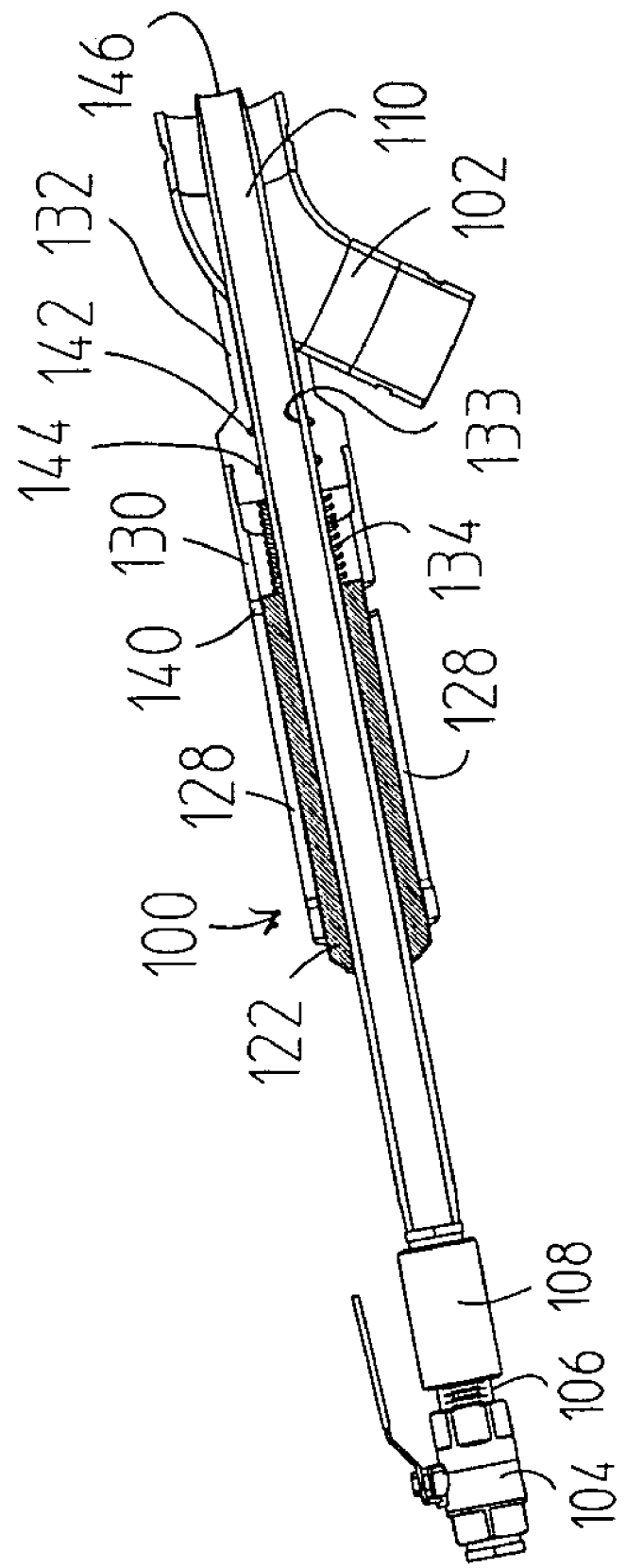
FIG. 4 is a cut-away and cross-sectional illustration of a portion of the positional nozzle and transport piping of FIG. 2a with the nozzle tube in an inserted forward position.

The positionable nozzle assembly is preferably located as shown in FIG. 2 and detailed in FIGS. 2a, 3, 4, and 5. Transport pipe 18, FIGS. 2 and 2a, is preferably straight with the air or other gas being injected into elbow 102. FIGS. 2a, 3, and 4, are preferably in line with the axis of transport pipe 18 to maximize the effect of the injection on the pellet slurry and to uniformly aspirate the pellet slurry. The location of elbow 102, or equivalent structure such as a "Y" configuration, is preferably in the first elbow after the pellet slurry leaves pelletizer 10. However, the elbow 102 can be located in an optional elbow further from pelletizer 10, not shown, and prior to dryer 20. Optionally a multiplicity of nozzle tubes can be inserted in at least one elbow to synergistically facilitate transport to and through at least one transport pipe 18.

FIG. 3 illustrates a portion of the positionable nozzle assembly 100 in a fully retracted position relative to the elbow 102. As shown, the rearward end of the nozzle tube 110 is surrounded by collar 122 which guides the rearward end as the nozzle tube slides within cylindrical housing 128. The nozzle tube 110 and collar 122 can be of a single body construction, but preferably the nozzle tube 110 and collar 122 are separate components attached together, such as by welding. The nozzle tube 110 and collar 122 are preferably welded at each end of the collar, at weldment 124 and weldment 126.

The nozzle tube 110 and collar 122 are variably positionable and are freely slideable through the housing 128. The forward end 130 of the housing 128 is threadingly attached to a seal transition collar 132 which is attached to elbow 102 at juncture 112. The forward end of the nozzle tube 110 is slidingly supported within the central bore 133 of the collar 132. Within the housing 128 and circumferentially positioned about the nozzle tube 110 is a tension spring 134. At least one guide pin 136 is attached to the collar 122. The guide pin 136 aligns with and is positionable within at least one groove 138 in housing 128 as detailed in FIG. 5. For larger transport pipes and nozzle assemblies, it is preferable to have at least two guide pins 136 that align positionably within at least two respective grooves 138 in the housing 128 to provide greater adjustment capability. Groove 138 is linearly elongate with the length of housing 128 and forms at least one angular recess 140 as shown in FIG. 3, or multiple recesses 140, 141 as shown in FIG. 5.

Returning to FIG. 3, tension spring 134, preferably a coiled spring, seats on the forward face of collar 122 as well as on the rearward face of the seal transition collar 132. In FIG. 3, the tension spring 134 is expanded for the retracted position of the nozzle tube assembly. FIG. 4 shows the tension spring 134 compressed in the forwardmost position of the positionable nozzle assembly 100 in which the nozzle tube 110 is fully inserted into the lumen of elbow 102. As shown, when fully inserted the collar 122 is received in the housing 128, and guide pin 136 is locked in angular recess 140 as more clearly illustrated in FIG. 5. When the nozzle tube is only partially inserted, on the other hand, the guide pin 136 would be locked in angular recess 141.

Nozzle tube 110 preferably is sealingly positioned in seal transition collar 132, FIGS. 3 and 4. Sealing is achieved by any mechanical means known to those skilled in the art including O-rings, "quad" rings, mechanical seals, and the like without being limited thereto. Preferably sealing is achieved using at least one O-ring 142 retained in a circumferential groove 144 in seal transition collar 132. O-ring 142 fits sealingly about the diameter of nozzle tube 110 such that nozzle tube 110 can be sealingly and slidably positioned through the at least one O-ring 142. Preferably at least two O-rings 142 are sealingly positioned in at least two respective circumferential grooves 144. Most preferably, a multiplicity of O-rings 142 are sealingly positioned in an equal multiplicity of circumferential grooves 144.

Figure 5:
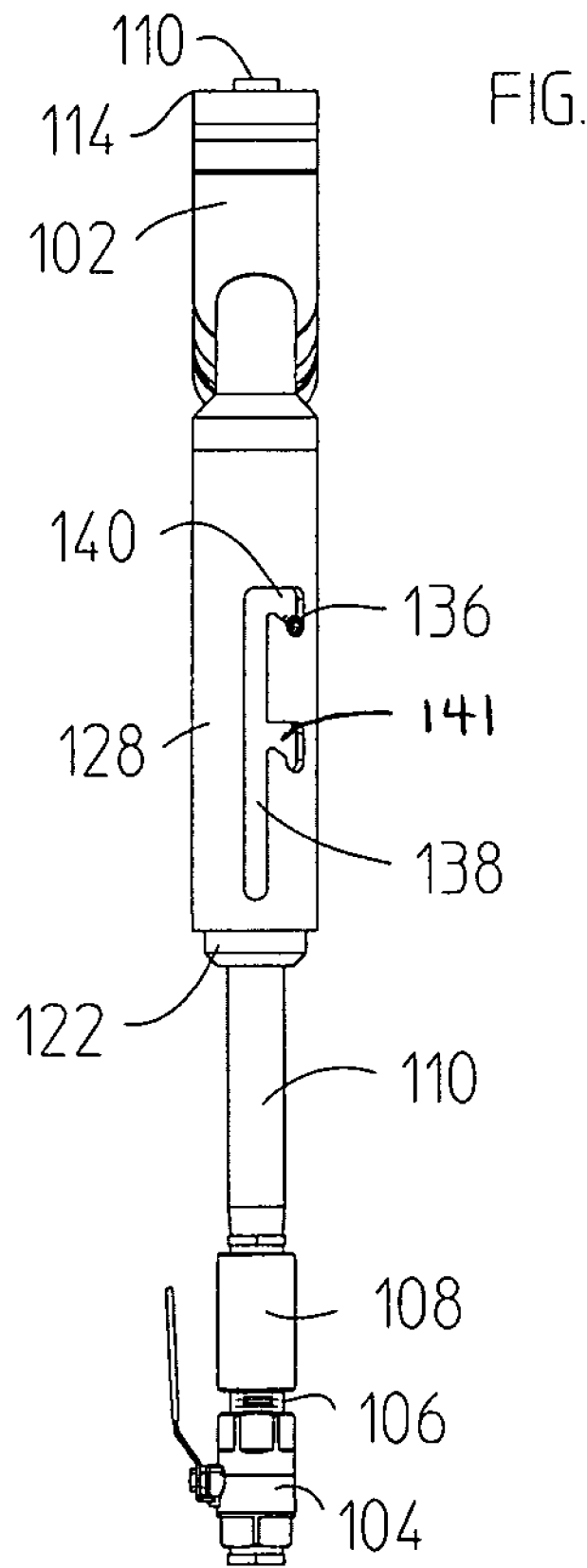
FIG. 5 is a schematic top view of a portion of the positional nozzle and transport piping of FIG. 2a with the nozzle tube in the inserted forward position.

FIG. 5 illustrates a portion of the positionable nozzle assembly 100 in which the nozzle tube 110 is fully inserted into the lumen of elbow 102 approximately flush with juncture 114 as comparably illustrated and described above for FIG. 2a. Collar 122 has been inserted into housing 128 and guide pin 136 has moved through groove 138 to be firmly positioned in angular recess 140.

Nozzle tube 110 can be generally positionable throughout a range from outside the exterior of elbow 102 within the lumen of seal transition collar 132 to at least the juncture 114 and optionally beyond. Preferably the fully retracted position is approximately flush with the exterior of elbow 102 and the fully inserted position is approximately at the juncture 114.

Movement of the nozzle tube 110 within the positionable nozzle assembly 100 can be accomplished by any suitable method including manual, pneumatic, electronic, automated, and hydraulic, and can optionally be with programmable logic control, PLC, and any combination thereof. The nozzle tube 110 can be moved at any time and is preferably manually movable. Manual control necessitates specific placement of the positioning as determined by the angular recess 140 positions. If movement is automated, however, a multiplicity of positions can be made available. Use of guide pin(s) 136 and the associated groove(s) 138 and angular recesses 140 and 141 in FIG. 5, for example, would not be expected to be necessary for control by automation.

Preferably nozzle tube 110 can be placed in a retracted position during the "start-up" of pelletizer 10 to eliminate its presence as an obstruction in the transport piping 15. Unwanted agglomerates can easily be formed during the beginning phase of the pelletization process and allowing the pellet slurry to use the full inside diameter of transport piping 15 as facilitated by the retraction of nozzle tube 110 is beneficial.

Positionable nozzle assembly 100 is designed to allow the operator(s) to inject pressurized air or other gas into transport pipe 18 while having the option to adjust the location of the nozzle tube 110 in relation to the transport pipe 18 and the elbow 102. The extent to which nozzle tube 110 can be retracted and inserted while still creating the desired aspiration is dependent upon, but not limited to, at least one of flow rate, pellet to transport liquid ratio, transport liquid temperature, diameter of the elbow 102 relative to the transport pipe 18, distance between the elbow 102 and the dryer 20, and the type of material being pelletized.

It is to be understood, as illustrated in FIGS. 2a, 3 and 4, that the outside diameter of nozzle tube 110 will be smaller than the inside diameter of elbow 102 at juncture 114, for example. In this regard, the space in the lumen should be large enough to allow the combined largest dimensions of at least two pellets, as measured using pellets of the maximum size for the particular pelletizing system, to pass between the exterior of the nozzle tube 110 and the interior of elbow 102 at juncture 114. Stated another way, the clearance area between the outside diameter of the nozzle tube and the inside diameter of the elbow lumen is large enough to allow at least two pellets, each having a maximum dimension for the pelletizer, to pass side by side therethrough without blocking, or clogging in, the clearance area. By way of example, without being limited thereto, one embodiment of the present invention is that of a 0.75 inch nominal nozzle tube 110 in combination with a 2 inch nominal nozzle influent pipe 118 to elbow 102, a 2 inch nominal elbow 102, and a 1.5 inch transport pipe 18 from elbow 102 to dryer 20. Another embodiment is that of a 0.75 inch nominal nozzle tube 110 in combination with a 3.0 inch nominal elbow 102, and a further embodiment is that of a 0.5 inch nominal nozzle tube 110 in combination with a 2.0 inch nominal elbow.

The orientation of the nozzle tube 110 in relation to the juncture 114 of elbow 102 in FIG. 2a can be concentrically centered about the centerline of that juncture 114, or reflected above the centerline, below the centerline, to the right or left of the centerline, or at any angle circumferentially about that centerline where the angle formed between the centerline of the nozzle tube 110 and the centerline of the juncture 114 of elbow 102 can range from 0° to a maximum deflection. Maximum deflection is defined as that degree of deflection at which the exterior of nozzle tube 110 touches the interior of the juncture 114 of elbow 102 and/or any apparatus into which the nozzle tube 110 extends downstream of that juncture 114 of elbow 102. Preferably the nozzle tube 110 is concentrically positioned and collinear about that centerline of juncture 114 of elbow 102. It is understood that the centerline of juncture 114 of elbow 102 is colinear with the centerline of transport pipe 18 downstream of that juncture 114.

The forward orifice 146 of nozzle tube 110 can be of any shape including round, square, rectangular, oval, polygonal, and the like and is preferably round. The diameter of the forward orifice 146 can be larger than, smaller than, or equal to the diameter of the nozzle tube 110 and is preferably equal thereto. When the diameter of forward orifice 146 is not equal to that of the nozzle tube 110, the diameter taperingly increases or decreases, respectively, for only that portion of the nozzle tube 110 that is not in contact with the most proximate O-ring 142; see FIGS. 3 and 4. The diameter of the distal orifice 146 cannot, however, be larger than the inside diameter of the seal transition collar 132. A decreasing taper 150 is illustrated in FIG. 6e for the terminus of nozzle tube 110. Similarly the forward orifice 146 can be semicircular as illustrated in FIG. 6c or conchoidal to C-shape as in FIG. 6d.

The inside of nozzle tube 110 can be provided with many different variations including but not limited to at least one of spiraled, contoured, rifled, or tapered inner surfaces, and many combinations thereof. FIG. 6f illustrates a conically tapered nozzle tube 110 wherein the taper decreases toward the forward orifice 146.

Figure 6A:
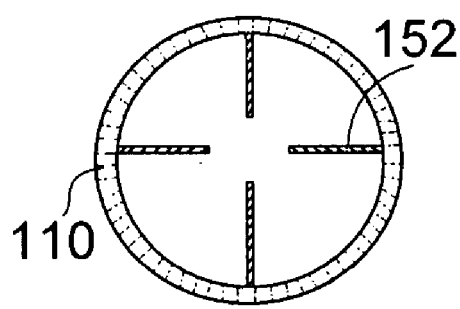
FIG. 6a is an illustration of the forward orifice of a nozzle tube containing perpendicularly oriented straight fins in accordance with the present invention.
Figure 6B:
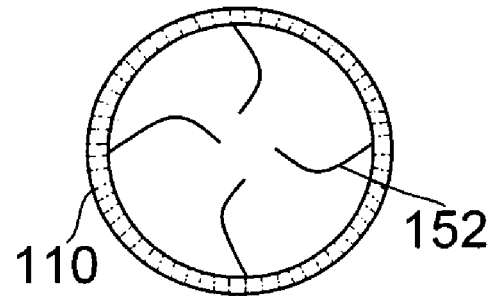
FIG. 6b is an illustration of the forward orifice of a nozzle tube containing perpendicularly oriented contoured fins in accordance with the present invention.
Figure 6C:
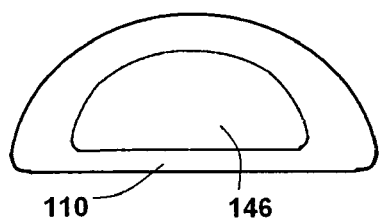
FIG. 6c is an illustration of a semicircular forward orifice for a nozzle tube in accordance with the present invention.
Figure 6E:
FIG. 6e is an illustration of a nozzle tube with tapered terminus in accordance with the present invention.
Figure 6D:
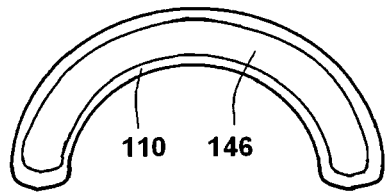
FIG. 6d is an illustration of a conchoidal to C-shaped forward orifice for a nozzle tube in accordance with the present invention.
Figure 6F:
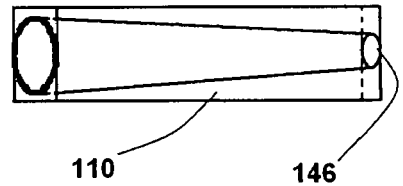
FIG. 6f is an illustration of a nozzle tube with a decreasingly conical tapered bore in accordance with the present invention.

The inside of nozzle tube 110 can also or alternatively contain one or more fins 152 as shown in FIGS. 6a and 6b. The fins can be straight and angled at 90° relative to the circumference of the nozzle tube 110, as illustrated in FIG. 6a, or at a lesser angle. Similarly, the fins can be bent or contoured relative to the circumference of the nozzle tube 110 as illustrated in FIG. 6b. The fins can be of any length ranging from less than to equal the length of the nozzle tube 110, and their height cannot exceed the radius of nozzle tube 110. Preferably the fins 152 are less than the length of the nozzle tube 110 and are smaller in height than the radius of nozzle tube 110. When multiple fins are included, they can also be placed at any angle in relation to each other and can be the same or different in construction. The purpose of the fins is to facilitate the creation of more turbulent flow within the transport pipe 18. More particularly, the flow of the aspirated pellet slurry can range from laminar to turbulent. Without intending to be bound by any theory, the injection of the air or other gas into the pellet slurry aspirates the transport liquid from the pellets such that the transport liquid is transported in a laminar fashion along the inner surface of the transport pipe 18 while the vapor mist and pellets are propagated in a more turbulent flow through the center of transport pipe 18 along the length of the transport pipe 18. In some cases, more turbulent flow may be desired, in which case fins may be advantageously added.

In accordance with the present invention, pressurized air or other gas can flow through nozzle tube 110 continuously or intermittently, most preferably continuously. This pressurized gas can be used to convey the pellets at a high velocity as described. This high velocity gas flow can be achieved using compressed gas producing a volume of flow exemplarily of at least 100 cubic meters per hour using a standard valve 104 for regulation of the pressure to at least 8 bar through the transport pipe 18. The pipe 18 is standard pipe diameter, preferably 1.5 inch pipe diameter. To those skilled in the art, flow rates and pipe diameters will vary according to the throughput volume, material composition including filler, transport liquid temperature, level of crystallinity desired, level of moisture desired, and the size of the pellets and granules. The high velocity gas effectively contacts the pellet water slurry, generating water vapor by aspiration, and disperses the pellets throughout the slurry line to propagate those pellets at increased velocity to the dryer 20, preferably at a rate of less than one second from the pelletizer 10 to the exit of the dryer 20. The high velocity aspiration produces a mixture of pellets in an air/gas mixture which may approach 98-99% by volume of the gaseous mixture. Through adjustment of the nozzle tube insertion depth as well as the addition of surface variations inside the nozzle, the flow characteristics of the slurry within the transport piping can be altered.

Returning now to FIG. 2a, the angle formed between the vertical axis of influent pipe 118 and the longitudinal axis of the transport pipe 18 can vary from 0° to 90° or more as required by the variance in the height of the pelletizer 10 relative to the height of the entrance 22 to the dryer 20 as shown in FIG. 2. This difference in height may be due to the physical positioning of the dryer 20 in relation to the pelletizer 10 or may be a consequence of the difference in the sizes of the dryer and pelletizer. The preferred angle range is from about 30° to 60°, with the more preferred angle being about 45°. The enlarged elbow 24 into the dryer entrance 22 facilitates the transition of the high velocity aspirated pellet/water slurry from the incoming transport pipe 18 into the entrance 22 of the dryer 20 and reduces the potential for pellet agglomeration into the dryer 20.

The outside surface of nozzle tube 110 and the inner lumens of influent pipe 118, elbow 102, effluent pipe 116, and transport pipe 18 can be coated with surface treatments to reduce abrasion, erosion, corrosion, wear, and undesirable adhesion and stricture. These surface treatments can be at least one of nitriding, carbonitriding, and sintering. Similarly the heretofore mentioned surfaces can undergo high velocity air and fuel modified thermal treatments, electrolytic plating, electroless plating, flame spray, thermal spray, plasma treatment, electroless nickel dispersion treatments, and electrolytic plasma treatments, singly and in combinations thereof. These treatments metallize the surface, preferably fixedly attach metal nitrides to the surface, more preferably fixedly attach metal carbides and metal carbonitrides to the surface, even more preferably fixedly attach diamond-like carbon to the surface, still more preferably attach diamond-like carbon in an abrasion-resistant metal matrix to the surface, and most preferably attach diamond-like carbon in a metal carbide matrix to the surface. Other ceramic materials can be used and are included herein by way of reference without intending to be limited. The coating thickness should not exceed approximately 0.002 inches without appropriate modification to the diameters of the parts through which the coated surface must pass sealingly.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. An injecting device for use with an underwater pelletizer apparatus that extrudes and cuts polymer strands into pellets, said apparatus including piping to introduce water into said pelletizer and a transport pathway to transport a water and pellet slurry out of said pelletizer and to a centrifugal dryer for drying said pellets, said injecting device comprising:
    a positionable nozzle assembly having a movable nozzle tube for introducing a pellet speed expediter into said water and pellet slurry to increase a velocity of the pellet slurry to and through the dryer such that more internal heat of the pellets is retained, said nozzle tube being selectively movable to different positions between a fully inserted position in which the nozzle tube is positioned forwardly to be within the piping and a fully retracted position in which the nozzle tube is withdrawn from the piping to provide unobstructed flow of the slurry through the piping and to prevent pellet hang-up on the nozzle tube.

2. The injecting device according to claim 1, wherein said transport pathway of said underwater pelletizer apparatus includes an outlet pipe coupled to said pelletizer through which the slurry is passed to a transport pipe that conveys the slurry to the dryer, said nozzle tube being positioned between said outlet pipe and said transport pipe.

3. The injecting device according to claim 2, wherein said outlet pipe and said transport pipe are joined by an angled joint into which said movable nozzle tube can extend.

4. The injecting device according to claim 3, wherein said positionable nozzle assembly further comprises a seal transition collar affixed to said angled joint, a housing attached to said seal transition collar, and a sliding collar that is fixed to said nozzle tube and received within said housing, said sliding collar and said nozzle tube being freely movable within said housing.

5. The injecting device according to claim 4, wherein said housing includes a tension spring positioned circumferentially around the nozzle tube and seated on a forward face of the sliding collar and a rearward face of the seal transition collar, said tension spring being compressed as said movable nozzle tube is advanced with respect to said angled joint.

6. The injecting device according to claim 5, wherein said housing has at least one groove that extends parallel with said movable nozzle tube, said groove having at least one angled recess, said sliding collar having a guide pin attached thereto that is positionable within said groove and, when received in said angled recess, locks the nozzle assembly at a set degree of tension spring compression associated with a particular insertion position.

7. The injecting device according to claim 6, wherein said pellet speed expediter is pressurized gas and said nozzle assembly further includes at least one valve configured to control the flow of said pressurized gas.

8. The injecting device according to claim 1, wherein said angled joint is an elbow, said nozzle tube being inserted into a lumen of said elbow so as to be in line with an axis of said transport pipe downstream of said nozzle assembly.

9. The injecting device according to claim 8, wherein said nozzle tube can be angularly positioned within the lumen of the elbow at an angle ranging from approximately 0° from a centerline of said transport pipe to a maximum angle defined by contact of an outside of the nozzle tube and an inner surface of said lumen or said transport pipe.

10. The injecting device according to claim 1, wherein said nozzle tube is manually adjustable between said fully inserted and fully retracted positions.

11. An apparatus for processing polymers and other materials into pellets comprising:
    a pelletizer to cut polymer strands into pellets;
    a dryer for drying said pellets;
    transport piping to transport a water and pellet slurry out of said pelletizer and to said dryer; and
    an injector to introduce a pellet speed expediter into said water and pellet slurry within said transport piping to enhance the speed of said pellets through said processing apparatus so that said pellets retain a high degree of internal heat, said injector including a positionable nozzle tube insertable within said transport piping and selectively movable to different positions between a fully inserted position in which the nozzle tube is positioned forwardly to be within the piping and a fully retracted position in which the nozzle tube is withdrawn from the piping to provide unobstructed flow of the slurry through the piping and to prevent pellet hang-up on the nozzle tube.

12. The apparatus according to claim 11, wherein said nozzle tube is part of an adjustable nozzle assembly including a seal transition collar affixed to said transport piping, a housing attached to said seal transition collar, and a sliding collar that is received within said housing, said sliding collar and said nozzle tube being freely movable within said housing.

13. The apparatus according to claim 12, wherein said housing includes a tension spring positioned circumferentially around the nozzle tube and seated on a forward face of the sliding collar and a rearward face of the seal transition collar, said tension spring being compressed as said nozzle assembly is advanced toward said fully inserted position.

14. The apparatus according to claim 13, wherein said housing has at least one groove that extends parallel with said nozzle tube, said groove having at least one angled recess, said sliding collar having a guide pin attached thereto that is positionable within said groove and, when received in said angled recess, locks the nozzle assembly at a set degree of tension spring compression associated with a particular insertion position.

15. The apparatus according to claim 14, wherein said pellet speed expediter is pressurized gas and said nozzle assembly further includes at least one valve configured to control the flow of said pressurized gas.

16. The apparatus according to claim 11, wherein said transport piping includes an elbow, said nozzle tube being inserted into a lumen of said elbow so as to be in line with an axis of said transport pipe downstream of said nozzle assembly.

17. The apparatus according to claim 16, wherein a clearance area between an outside diameter of said nozzle tube and an inside diameter of said elbow lumen is large enough to allow at least two pellets, each having a maximum dimension for the pelletizer, to pass side by side therethrough without blockage of said clearance area.

18. The injecting device according to claim 1, wherein a geometric configuration of said nozzle tube is one of round, square, rectangular, oval, polygonal, semicircular, conchoidal or C-shaped.

19. The injecting device according to claim 18, wherein said nozzle tube is tapered at an effluent end.

20. The injecting device according to claim 18, wherein said nozzle tube has an inner surface that is spiraled, contoured, rifled, tapered or some combination thereof.

21. The injecting device according to claim 1, wherein an external surface of said nozzle tube and/or an internal surface of said transport pathway is surface coated or treated to prevent erosion, abrasion, corrosion, wear and stricture of pellets to said surfaces.

22. The apparatus according to claim 11, wherein an outside surface of said nozzle tube or an inner lumen of said transport pipe is subjected to a surface treatment using at least one material selected from the group consisting of metals, metal oxides, metal carbides, metal nitrides, and metal carbonitrides.

23. The apparatus according to claim 11, wherein an outside surface of said nozzle tube or an inner lumen of said transport pipe is subjected to at least one surface treatment selected from the group consisting of sintering, metallization, flame spray, thermal spray, plasma treatment, electroless nickel dispersion treatment, electrolytic plasma treatment and combinations thereof.

24. The apparatus according to claim 22, wherein said surface treatment fixedly attaches metal oxides.

25. The apparatus according to claim 22, wherein said surface treatment fixedly attaches metal nitrides.

26. The apparatus according to claim 22, wherein said surface treatment fixedly attaches metal carbonitrides.

27. The apparatus according to claim 22, wherein said surface treatment fixedly attaches diamond-like carbon.

28. The apparatus according to claim 22, wherein said surface treatment fixedly attaches diamond-like carbon in a metal matrix.

29. The apparatus according to claim 22, wherein said surface treatment fixedly attaches diamond-like carbon in a metal carbide matrix.

30. The apparatus according to claim 22, wherein said surface treatment forms a coating having a thickness not exceeding approximately 0.002 inches.

31. The injecting device of claim 3, wherein said nozzle tube in said fully retracted position is flush with an exterior of said angled joint.

32. The apparatus of claim 16, wherein said nozzle tube in said fully retracted position is flush with an exterior of said elbow.

* * * * *